(12) United States Patent
Calhoon

(10) Patent No.: US 7,450,852 B2
(45) Date of Patent: Nov. 11, 2008

(54) IR CONTROL SIGNAL DISTRIBUTION VIA A COMMUNICATIONS NETWORK

(75) Inventor: John C Calhoon, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 11/186,075

(22) Filed: Jul. 21, 2005

(65) Prior Publication Data

US 2007/0019958 A1    Jan. 25, 2007

(51) Int. Cl.
*H04B 10/20* (2006.01)
*H04B 10/00* (2006.01)

(52) U.S. Cl. ............... 398/106; 398/107; 398/58; 398/113; 398/126

(58) Field of Classification Search .......... 398/106, 398/107, 110, 113, 139, 58, 126, 118; 370/310, 370/913; 348/734; 455/3.06, 74
See application file for complete search history.

(56) References Cited

U.S. PATENT DOCUMENTS 7,280,823 B2 * 10/2007 Ternullo et al. .......... 455/414.4

| 2004/0002636 A1 | 1/2004 | Teicher et al. |
| 2004/0155809 A1 | 8/2004 | Eyer |
| 2005/0017890 A1 * | 1/2005 | Nam et al. .............. 341/175 |
| 2005/0080496 A1 | 4/2005 | Hayes et al. |
| 2005/0113946 A9 * | 5/2005 | Janik .................. 700/94 |

FOREIGN PATENT DOCUMENTS

| WO | WO03/103189 | 12/2003 |
| WO | WO2005055166 | 6/2005 |

* cited by examiner

*Primary Examiner*—Dalzid Singh
(74) *Attorney, Agent, or Firm*—Lee & Hayes, PLLC

(57) ABSTRACT

Described herein are technologies directed towards IR-to-network conversion. With the described technology, a system may convert an infrared (IR) control signal from an IR remote controller into a network-transmittable message package and transmit that package via a communications network, such as the Internet (or a network compatible therewith). The IR control signal is destined for a to-be-controlled audio/visual (AV) device. The transmitted network message packet is received at the location of the to-be-controlled AV device and converted back into its original IR control signal. The signal is transmitted to the AV device; thereby effecting control of that device.

12 Claims, 4 Drawing Sheets

IR CONTROL SIGNAL DISTRIBUTION VIA A COMMUNICATIONS NETWORK

BACKGROUND

In the audio/visual (AV) industry, a person may control an AV electronic device (e.g., a television) remotely using a "remote controller," which is commonly called a "remote-control." Typically, a remote controller works by sending control signals via an infrared (IR) light beam. This IR light beam is low enough in frequency that the human eye cannot see it, but the IR light beam can be detected by a receiver in a to-be-controlled AV device, such as a VCR.

Today, IR remote controllers are a standard feature on nearly all consumer electronics products, including TVs, VCRs, cable and satellite receivers, DVD players/recorders, AV equipment (e.g., radio and CD equipment), digital video recorders (DVRs), centralized media computers, etc. Typically, each AV electronic device has its own designated remote controller. Alternatively, some remote controllers are called "universal" because they are or can be programmed to control multiple different AV devices. Each AV device has a defined set of control codes, which are modulated onto an infrared light beam commonly using a 38 Khz carrier. For example, code "1343" may turn on Brand-X television, but have no effect on Brand-Y television. Conversely, code "6422" may change the channel on Brand-Y TV, but have no effect on Brand-X TV.

So as to avoid to inadvertently "controlling" electronic equipment through walls, IR technology for remote controllers was chosen to restrict the control to the equipment within the user's line of sight. Therefore, the typical remote controller technology ubiquitously employed by AV devices is designed to control a device within the same room as the user.

However, in some instances, consumers choose to distribute the AV outputs of their AV devices throughout their home (or business or other establishment) instead of buying duplicate equipment for each room. Equipment to distribute audio and video signals in a home is readily available today. Such distribution is most commonly done for AV output devices such as centralized media computers, satellite receivers, DVD players, DVRs and the like.

In these distributed AV layouts, some or many of the AV devices are located in a centralized AV closet or dispersed amongst several locations. Because of this, the user and the to-be-controlled AV devices are often located in different rooms. Consequently, the line-of-sight communications of IR remote controls is useless.

The following are some of the conventional approaches designed to address this line-of-sight restriction in a distributed AV layout: dedicated hardware, existing electrical wiring, and existing AV cabling.

Dedicated hardwire: This approach involves installing new wiring between the distributed and remote AV location (e.g., a bedroom) to a location of the to-be-controlled device (e.g., DVD in an AV media closet). The remote location will include a dedicated remote IR receiver connected to a connecting block and that block is connected to the dedicated wiring. That wiring is connected to an IR emitter in the media closest and that emitter is configured to emit IR to control the to-be-controlled device. This hardwire system requires that dedicated wires be run from room to room. This is particularly difficult and expensive to do with existing construction.

Existing Electrical Wiring: Instead of installing and using dedicated wiring, this approach uses existing wiring already found in a home or business. In this case, that wiring is the existing electrical wiring. While not designed to carry a communications signal, existing electrical wiring can be utilized to carry simple messages to devices plugged into that electrical wiring. However, this communication medium tends to be unreliable and prone to failure due to noise on the home's electrical system Existing AV Wiring: Many homes have AV wiring. The most common form of this wiring is coaxial cable (simply called "coax"). Another conventional approach involves the insertion of the control code (from the IR remote controller) into the AV signal on the coax that is used to distribute AV throughout the home. However, this signal-insertion approach requires cumbersome signal injectors and puts noise on the video signal. This "noise" is often very noticeable to users as a video or sound "glitch" or "hiccup."

SUMMARY

Described herein are technologies directed towards IR-to-network conversion. With the described technology, a system may convert an infrared (IR) control signal from an IR remote controller into a network-transmittable message package and transmit that package via a communications network, such as the Internet (or a network compatible therewith). The IR control signal is destined for a to-be-controlled audio/visual (AV) device. The transmitted network message packet is received at the location of the to-be-controlled AV device and converted back into its original IR control signal. The signal is transmitted to the AV device; thereby effecting control of that device.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same numbers are used throughout the drawings to reference like elements and features.

DETAILED DESCRIPTION

The following description sets forth techniques for a IR-to-network conversion system to convert an infrared (IR) control signal from an IR remote controller into a network-transmittable message package and transmit that package via a communications network, such as the Internet (or a network compatible therewith). The IR control signal is destined for a to-be-controlled audio/visual (AV) device. The transmitted network message packet is received at the location of the to-be-controlled AV device and converted back into its original IR control signal. The signal is transmitted to the AV device; thereby effecting control of that device.

More specifically, the following description sets forth techniques that employ an IR-to-network converter to receive an IR control signal from an IR remote controller. The IR-to-network converter converts the IR control signal into an XML formatted message and packages it for transmission over a communications network, such as a one using the TCP/IP protocol. The IR-to-network converter transmits the XML-formatted and network-packaged message via a communication network. This network may be wired or wireless.

The described techniques also use a network-coupled network-to-IR converter to receive the XML-formatted and network-packaged message which was sent by the IR-to-network converter. The network-to-IR converter converts the XML-formatted and network-packaged message back into its original IR control signal. The network-to-IR converter transmits the IR control signal to the to-be-controlled AV device, such as a DVD player.

Exemplary IR-to-Network Conversion System

Figure 1:
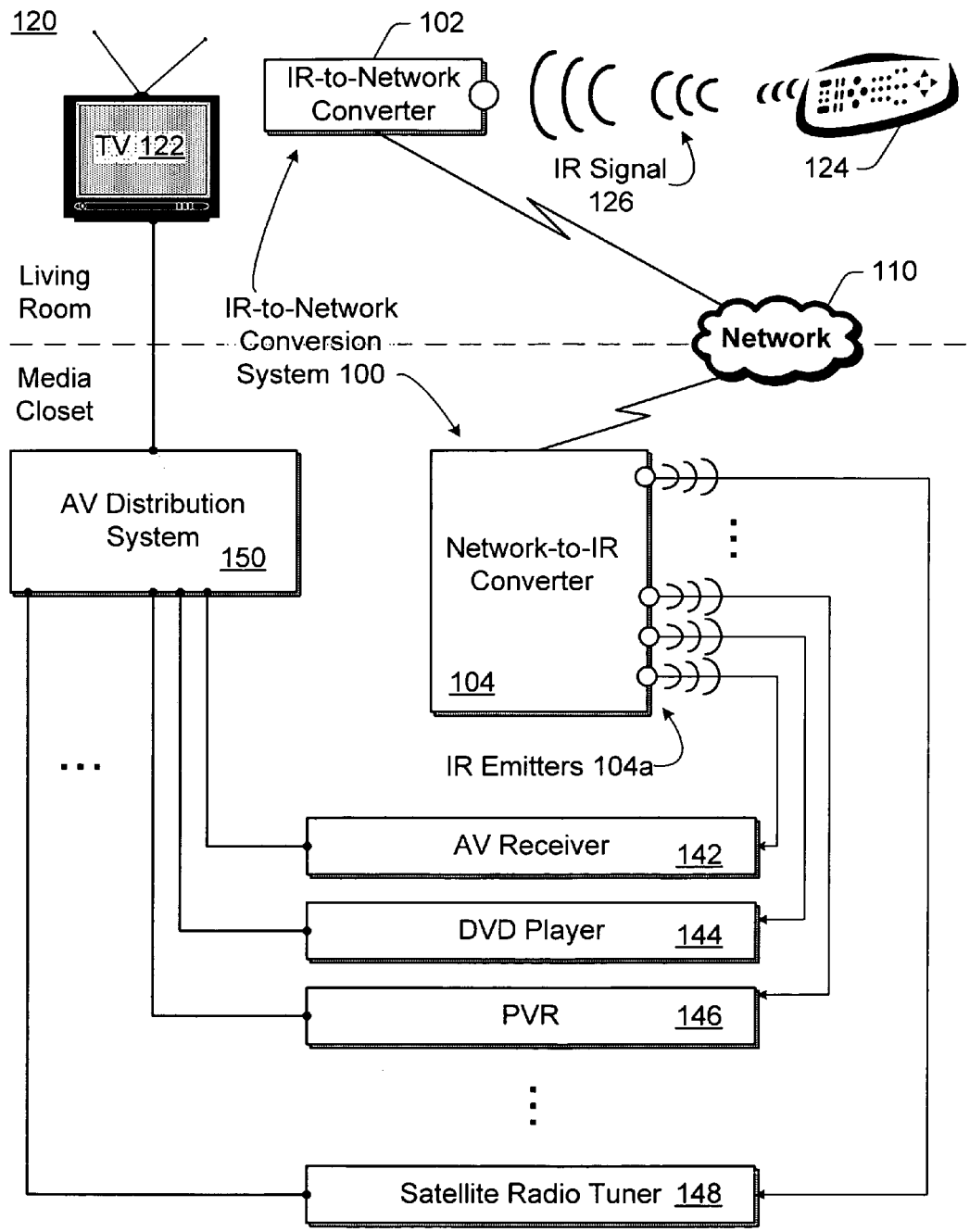
FIG. 1 illustrates an exemplary IR-to-network conversion system in accordance with one or more implementations described herein.

FIG. 1 illustrates exemplary components of an IR-to-network conversion system 100. Specifically, the exemplary components include an IR-to-network converter 102 and a network-to-IR converter 104. These converters have network connectivity which might or might not use an intermediate network device, such as a network router or hub. As depicted, these converters connect to a wired or wireless network 110. The network may be a local area network (LAN), wide area network (WAN), a private network, a public network, the Internet, or some other computer communications network. The network may employee any available protocol, but one or more implementations described herein employs the TCP/IP protocol.

As depicted in FIG. 1, a living room 120 of a house (or any other room in any location for that matter) includes a TV 122 and an IR remote controller 124. The controller is designated to control one or more AV devices (other than the TV 122) located in another room. When a user (called "Joe User" herein) wish to control an AV device located in another room, he presses a button on the remote controller 124. The controller sends an IR signal 126 having a code which the AV device understands. The IR-to-network converter 102 receives the IR signal 126. The IR-to-network converter 102 is typically located nearby the TV, but may be located anywhere in the line-of-sight of the remote controller.

The IR-to-network converter 102 converts the IR control signal 126 into a message formatted according to the eXtensible Mark-up Language (XML). The converter packages the XML-formatted message for transmission over the network 110 The IR-to-network converter transmits the XML-formatted and network-packaged message via the network.

As depicted in FIG. 1, a media closet 130 of a house (or any other room in any location for that matter) includes the network-to-IR converter 104, various AV devices 140, and AV distribution system 150. The network-to-IR converter 104 has one or more IR emitters 104a for transmitting IR signals to the various AV devices 140.

Each of the various AV devices 140 are capable of being controlled via IR control signals. As depicted, examples of IR-signal-controlled AV devices include AV receiver 142, DVD Player 144, digital video recorder (DVR) 146, and a satellite radio tuner 148. Other examples of suitable IR-signal-controlled AV devices includes (but are not limited to): a cable-TV receiver, a satellite-TV receiver, a Digital Audio Receiver (DAR), a Personal Video Recorder (PVR), an integrated multimedia computer, a CD-player, an Internet radio tuner, etc.

The AV distribution system 150 routes the AV signals from these various AV devices and to one or more AV presentation devices located in other rooms, such as the TV 122 in living room 120.

Figure 2:
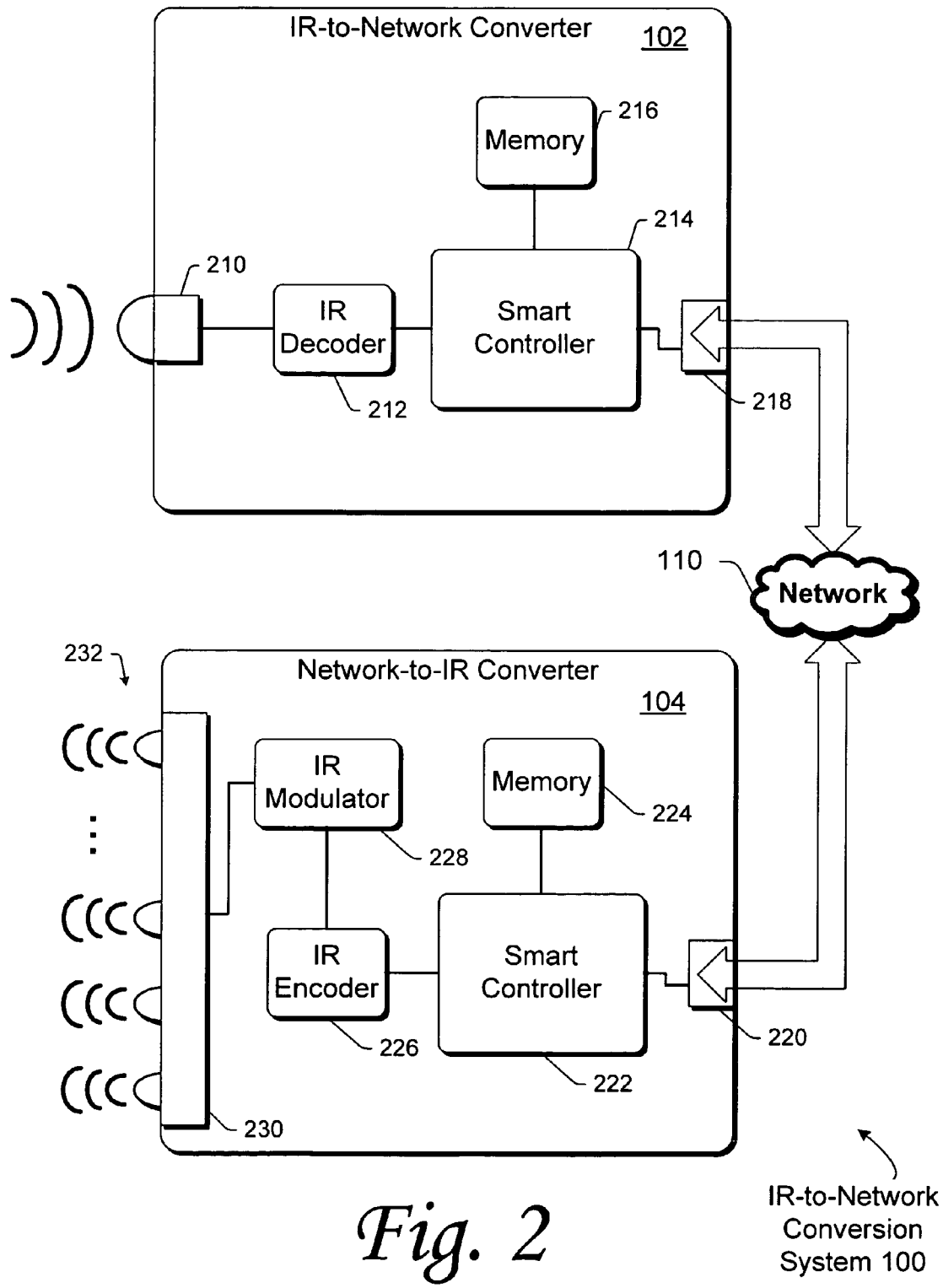
FIG. 2 illustrates a block diagram representation of an exemplary IR-to-network converter and network-to-IR converter components of an exemplary IR-to-network conversion system, in accordance with one or more implementations described herein.

FIG. 2 illustrates the IR-to-network converter 102 and the network-to-IR converter 104 of the IR-to-network conversion system 100, as described herein. These converters may be implemented in software, hardware, firmware, or some combination of thereof. These converters are connected via a communications network, such as network 110.

As depicted, the IR-to-network converter 102 includes the following components: an IR detector 210, IR decoder 212, smart controller 214 (e.g., a processing core), system memory 216, and network connection port 218. Although not explicitly depicted, the IR-to-network converter 102 may also include a power source, embedded operating system (OS), program code to read and convert IR control codes into XML message, TCP/IP stack, and HTTP stack.

As depicted, the network-to-IR converter 104 includes the following components: a network connection port 220, smart controller 222 (e.g., a processing core), system memory 224, IR encoder 226, IR modulator 228, IR connecting block 230, and IR emitters 232. Although not explicitly depicted, the network-to-IR converter 104 may also include a power source, embedded operating system (OS), program code to read create IR code from parsed XML message, an XML parser, TCP/IP stack, and web server with HTTP support.

All these components are readily available and those skilled in the art will understand how to connect these components on a circuit board. The components of each converter are assembled on to a printed circuit board and enclosed in a housing. Program software code is burned into the system memory area during manufacturing time. Alternatively, each converter may have a fixed IP network address assigned and burned into memory.

Exemplary Environment and Scenario

Figure 3:
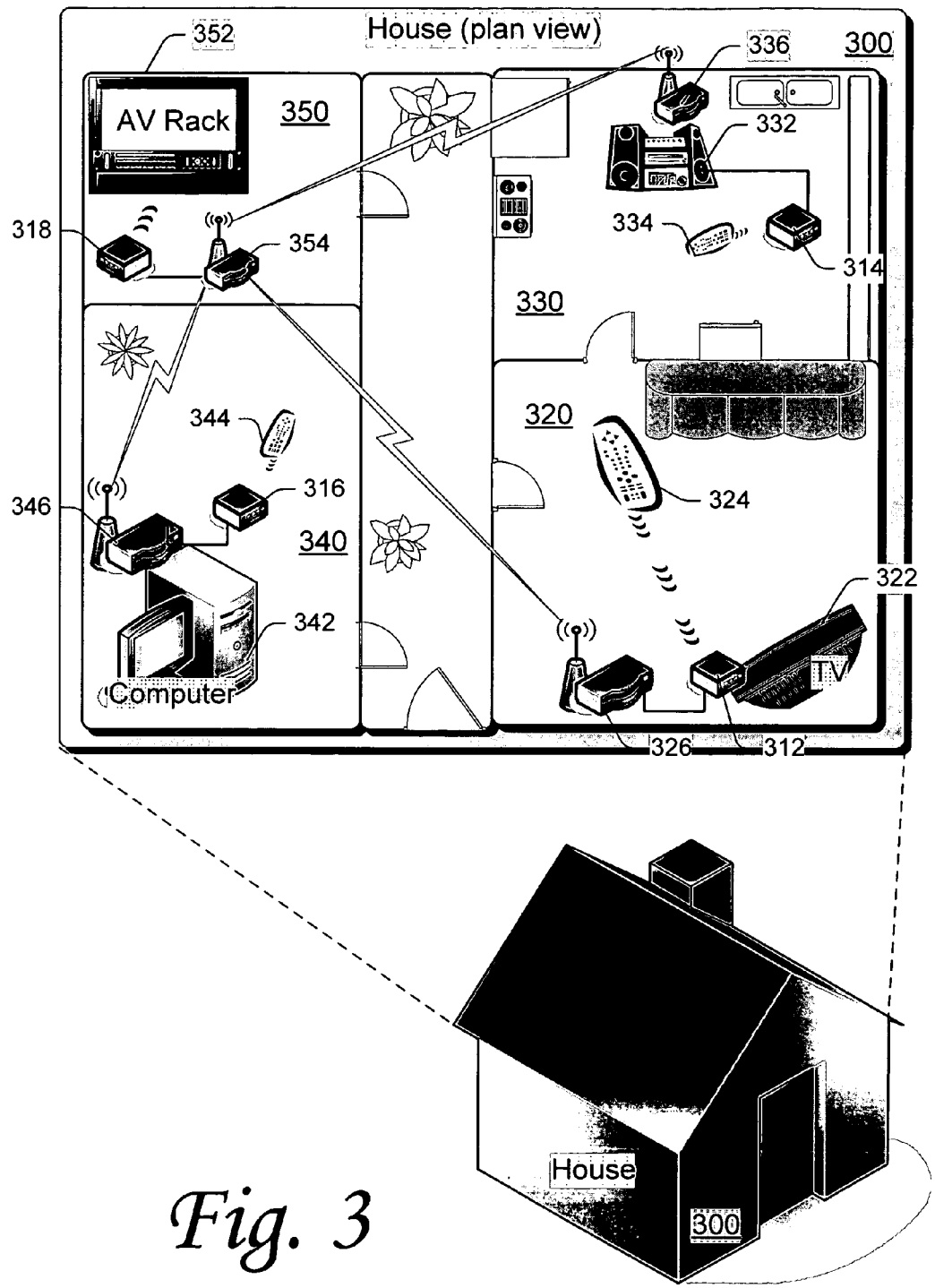
FIG. 3 illustrates an exemplary environment, in accordance with one or more implementations described herein, within which an exemplary IR-to-network conversion system might operate.

FIG. 3 illustrates, at a high-level, the environmental context of the IR-to-network conversion system 100, as described herein, in an exemplary home network scenario. Because the components of the IR-to-network conversion system are not centrally located in FIG. 3, the 100 reference designator is not used in this figure. Instead, the components of the system are indicated by reference designators in this figure have this format: 31x (where "x" is any number). For example, FIG. 3 depicts three IR-to-network converters at 312, 314, and 316 and one network-to-IR converter at 318. Each of these converters has a statically or dynamically assigned network address (e.g., an IP address).

FIG. 3 illustrates a house 300 with a typical wireless network. While the network shown here is wireless, the network may be wired in other instances. FIG. 3 also depicts a plan view of the same house. For the sake of simplicity and brevity, the house 300 is shown with just four rooms: living room 320, kitchen 330, den 340 and media closet 350. While the house 300 depicted in FIG. 3 is small, those of ordinary skill in the art understand that the house (and thus the networking environment) may be substantially larger than the example shown in FIG. 3.

The living room 320 has AV presentation device, specifically a television 322, a remote controller 324, a wireless network device 326, and the IR-to-network converter 312. In this depicted scenario, the IR-to-network converter 312 and the other converters are connected to a computer communications network (such as a LAN) via a wired or wireless coupling with a wireless network device, such as wireless network device 326. A wireless access point (WAP) is an example of such a device.

The kitchen 330 has AV presentation device, specifically audio speakers 332, a remote controller 334, a wireless network device 336, and the IR-to-network converter 314.

The den 340 has AV presentation device, specifically computer 342, a remote controller 344, a wireless network device 346, and the IR-to-network converter 316. The computer 342 (or another network accessible computer) may be running an integrated multimedia software product, such as the Microsoft® Windows® XP Media Center™ Edition integrated multimedia & entertainment product.

The media closet 350 has one or more AV output devices located in AV rack 352. This rack includes IR-signal-controlled AV devices, such an AV receiver, DVD player, digital video recorder (DVR), a satellite radio tuner, and the like. The rack also includes AV distribution system for transmitting the AV signal output from the AV devices to one or more AV presentation devices, such as TV 322. The media closet 350 also has a wireless network device 354 (such as a network hub) and the network-to-IR converter at 318.

The following illustrates exemplary operation of the IR-to-network conversion system within this high-level, the environmental context depicted by FIG. 3. Joe User may be sitting on the couch in the living room 320 watching satellite television. Joe changes the channel using remote controller 324 for the satellite-TV receiver. However, the receiver is not located in the living room with Joe. Instead, it is located in the AV rack 352 in the media closet 350. Fortunately, with the IR-to-network conversion system, Joe User can use his remote controller to change the channel on the satellite-TV receiver located in a different room from Joe.

When Joe presses a selected button on the remote controller 324, the controller emits a modulated stream of IR light and the light is received by the to the IR-to-network converter 312. The modulated stream includes the appropriate IR control signal (e.g., "5456") to direct the satellite-TV receiver to perform the action associated with the button pressed on the remote controller.

Upon reception, the IR-to-network converter 312 demodulates the incoming IR light stream and produces the IR control code in a human-readable and textual-based formatted message. That message may be formatted, for example, using XML. That message represents the incoming IR control code.

By way of example, such an XML message representing an IR control code "1234" might appear as follows:

```
<IR_Code>
    <Code>1234</Code>
</IR_Code>
```

After creating the XML message, the IR-to-network converter 312 establishes a connection to the network-to-IR converter 318 using the network-to-IR converter's statically or dynamically assigned network address and sends the XML message to it. In at least one implementation, the IR-to-network converter 312 sends the XML message via an HTTP Put command.

If a connection between the two converters has not previously been accomplished, the IR-to-network converter 312 may issue an Address Resolution Protocol (ARP) request to determine the MAC address of the network-to-IR converter 318.

When the message is received, the network-to-IR converter at 318 parses the XML message and the parsed IR code modulated into a 38 Khz signal. That modulated signal is sent to IR emitters (like IR emitters 104a shown in FIG. 1). The IR emitters convert the modulated signal to a stream of infrared light.

In at least one implementation, all of the AV output devices in the AV rack 352 receives the IR control code from the IR emitters of the network-to-IR converter at 318. However, since generally each device only responds to a specific set of discrete codes, only one device is expect to respond to the IR control code.

In this example, the satellite-TV receiver in the AV rack 352 responds by changing channels. That change is manifested by the channel being shown on the TV 322 changing. The AV signal output from the satellite-TV receiver is wired to the TV 322 via AV cabling and an AV distribution network. Such wiring and distribution network is not shown in FIG. 3, but is shown in FIG. 1.

With respect to its remote controller 334 and audio speakers 332, the kitchen IR-to-network converter 314 behaves in a manner corresponding to that described above for the living-room IR-to-network converter 312. Similarly, with respect to its remote controller 344 and media computer 342, the den IR-to-network converter 316 behaves in a manner corresponding to that described above for the living-room IR-to-network converter 312.

Methodological Implementation

Figure 4:
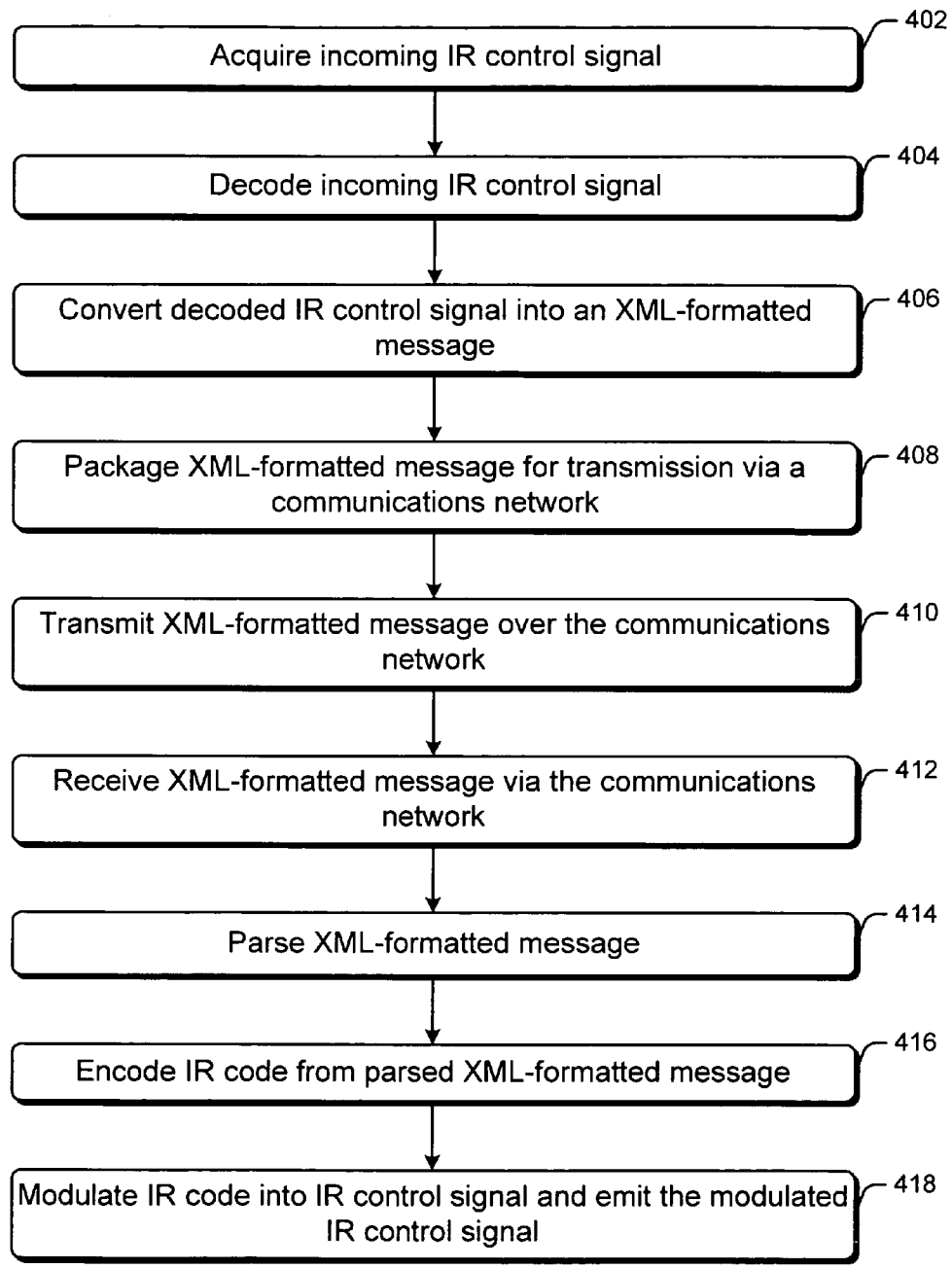
FIG. 4 illustrates a flow diagram showing a methodological implementation described herein.

FIG. 4 shows method 400 for converting an infrared (IR) control signal from an IR remote controller into a network-transmittable message package and transmitting that package via a communications network. This method 400 is performed by the one or more of the various components as depicted in FIGS. 1 through 3. Furthermore, this method 400 may be performed in software, hardware, firmware, or a combination thereof.

For ease of understanding, this method is delineated as separate steps represented as independent blocks in FIG. 4; however, these separately delineated steps should not be construed as necessarily order dependent in their performance. Additionally, for discussion purposes, the method 400 is described with reference to FIG. 1. Also for discussion purposes, particular components are indicated as performing particular functions; however, other components (or combinations of components) may perform the particular functions.

At 402 of FIG. 4, the IR-to-network converter 102 acquires the incoming infrared (IR) control signal from an IR remote controller. The IR control signal is destined for a to-be-controlled audio/visual (AV) device.

At 404, the IR-to-network converter 102 demodulates and decodes the incoming IR control signal. In other words, it determines the IR control code in the incoming signal.

At 406, the IR-to-network converter 102 converts the decoded IR control signal (i.e., the code in the control signal) into a human-readable and textual-based format. In particular, the XML format. By way of example, such an XML message representing an IR control code "1234" might appear as follows:

```
<IR_Code>
    <Code>1234</Code>
</IR_Code>
```

At 408, the IR-to-network converter 102 packages the XML-formatted message for transmission via a communications network. For example, the message may be formatted for transmission across a typical TCP/IP network (such as the Internet).

At 410, the IR-to-network converter 102 transmits the XML-formatted message over the communications network to the network-to-IR converter 104. In doing so, the IR-to-network converter 102 uses the network-to-IR converter's statically or dynamically assigned network address (e.g., IP address). In at least one implementation, the IR-to-network converter 312 sends the XML message via an HTTP Put command.

At 412 of FIG. 4, the network-to-IR converter 104 receives XML-formatted message via the communications network.

At 414, the network-to-IR converter 104 parses the XML-formatted message to extract the IR code therein.

At 416, the network-to-IR converter 104 encodes the IR code, which was parsed from the XML-formatted message.

At 418, the network-to-IR converter 104 modulates the IR code into an IR control signal and emits that modulated IR control signal via IR emitters. One or more AV output devices in the AV rack 352 receives the IR control code from the IR emitters. However, since generally each device only responds to a specific set of discrete codes, only one device is expect to respond to the IR control code.

Alternatively, the network-to-IR converter 104 may determine the intended destination AV output device. In that instance, the converter emits the modulated IR control signal to only the intended destination AV output device. An identifying tag in the XML-formatted message may help identify the intended destination. Alternatively, the network-to-IR converter 104 may identify the intended AV output device by cross-reference to the defined set of control codes for particular devices.

CONCLUSION

The techniques, described herein, may be implemented in many ways, including (but not limited to) program modules, general- and special-purpose computing systems, network servers and equipment, dedicated electronics and hardware, firmware, and as part of one or more computer networks.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. An infrared distribution system comprising:
   an infrared-to-network conversion module comprising:
      an infrared (IR) signal decoder configured to decode an IR control code from a coded IR signal received from an IR remote controller;
      a converter configured to convert the decoded IR control code into a message formatted for transmission via a computer communications network;
      a transmitter configured to transmit the formatted message via the communications network; and
   a network-to-infrared conversion module comprising:
      a receiver configured to receive a formatted message received via a communications network from the transmitter;
      a message parser configured to parse the formatted message and extract the IR control code therein;
      an encoder configured to encode the IR control code parsed from the formatted message into an IR control signal;
      an emitter configured to emit the encoded IR control signal.

2. A system as recited in claim 1 further comprising an IR receiver configured to receive the coded IR signal.

3. A system as recited in claim 1, wherein the IR control code is part of a defined set of IR control codes which effect the operation of an audio/visual (AV) output device.

4. A system as recited in claim 1, wherein the formatted message is formatted to be human-readable, textual-based, or both.

5. A system as recited in claim 1, wherein the formatted message is formatted to be human-readable, hierarchical, or both.

6. A system as recited in claim 1, wherein the formatted message is formatted using a hierarchical data structure.

7. A system as recited in claim 1, wherein the formatted message is formatted using XML.

8. A system as recited in claim 1, wherein the formatted message is formatted using XML in accordance with this hierarchical data structure:

```
<IR_Code>
    <Code>code_content</Code>
</IR_Code>
``` where "IR_Code" is any tag identifying the data structure type and "Code" is a tag identifying "code_content" as the IR control code.

9. A system as recited in claim 1, wherein the transmitter is further configured to transmit the formatted message via the communications network using TCP/IP protocol.

10. A system as recited in claim 1, wherein the receiver is further configured to receive the formatted message via the communications network using TCP/IP protocol.

11. An infrared distribution method comprising:
    receiving a coded IR signal by an infrared-to-network conversion module;
    decoding an infrared (IR) control code from the coded IR signal received from an IR remote controller;
    converting the decoded IR control code into a message formatted in XML;
    transmitting the formatted message via a communications network to a network-to-infrared conversion module;
    receiving the formatted message transmitted via a communications network by the network-to-infrared conversion module;
    parsing the formatted message and extracting the decoded IR control code therein;
    encoding the extracted decoded IR control code into an IR control signal;
    emitting the encoded IR control signal.

12. A method as recited in claim 11, wherein the IR control code is part of a defined set of IR control codes which effect the operation of an audio/visual (AV) output device.

* * * * *